N. S. KEITH.
APPARATUS FOR REMOVING TIN FROM SCRAPS, &c., BY ELECTRICITY.
No. 179,658. Patented July 11, 1876.
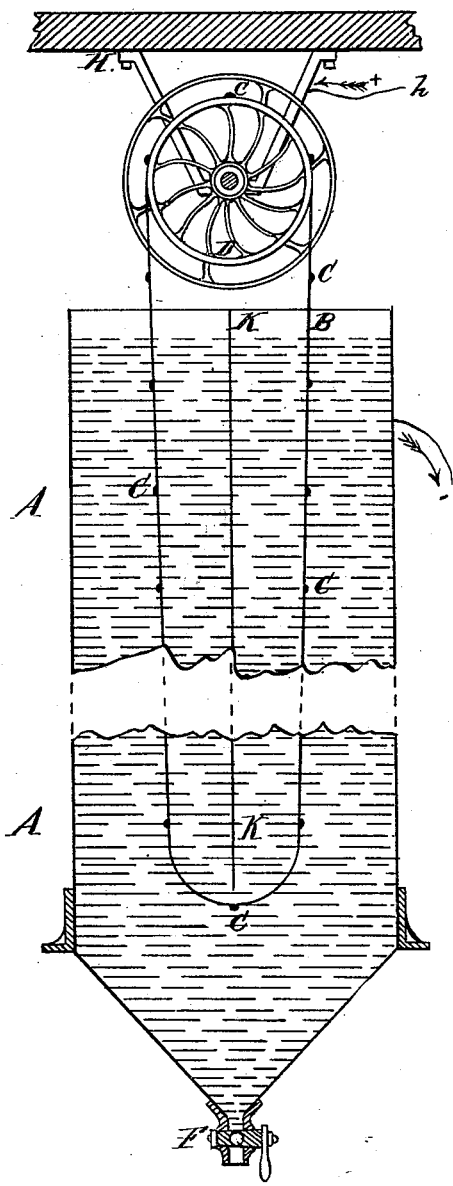
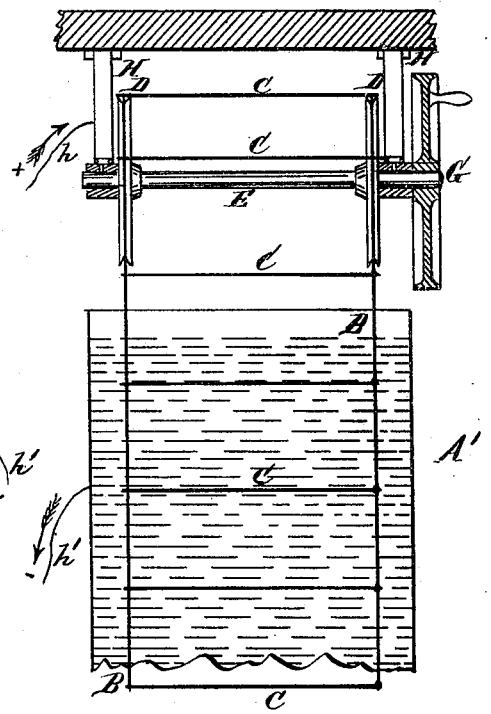
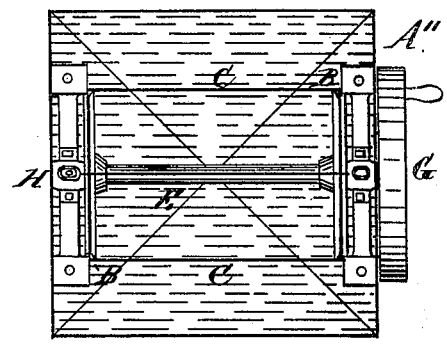
Witnesses
W. L. Bement.
W. H. Isaacs.
Inventor
Nathaniel Shepard Keith
by his atty
E. S. Renwick

UNITED STATES PATENT OFFICE.

NATHANIEL S. KEITH, OF BROOKLYN, NEW YORK.

IMPROVEMENT IN APPARATUS FOR REMOVING TIN FROM SCRAPS, &c., BY ELECTRICITY.

Specification forming part of Letters Patent No. 179,658, dated July 11, 1876; application filed January 11, 1876.

*To all whom it may concern:*

Be it known that I, NATHANIEL SHEPARD KEITH, of Brooklyn, in the county of Kings and State of New York, have made an invention of certain new and useful improvements in the art of recovering tin from scrap tin-plate, and in apparatus for practicing the same; and that the following is a full, clear, and exact description of the same.

My improvements in the said art consist of certain processes in which the agency of electricity is made use of, and which are based upon the following discoveries, viz: first, that if the scraps of tin-plate are separated and extended, the tin can be removed from all parts of each scrap simultaneously, and consequently the separation and recovery of the tin and iron can be effected with great rapidity; second, that the scraps may be moved progressively through a liquid electrolyzing-bath while under the action of the electricity and the solution constituting the bath, and, consequently, that the tin scraps can be entered into and removed from the electrolyzing-bath in continuous progression, as distinguished from charging a multitude of scraps simultaneously into the bath, leaving all of them therein during the same period, and then removing them therefrom simultaneously; third, that if the scrap tin-plate in the bath be subjected simultaneously to the action of electricity and heat exceeding 160° Fahrenheit, or thereabout, while in the electrolyzing-bath, the tin may be dissolved and removed without material solution or oxidation of the iron which forms the body of the scraps.

My improvements in the apparatus for practicing the said processes consist of certain combinations of the following devices, viz: a vat for holding the electrolyzing-bath; an endless-chain conveyer, or some substitute or equivalent therefor, for holding and moving the scrap tin-plate through the said vat; a central electrical cathode; means for heating the liquid in the vat; and a galvanic battery, or some equivalent or substitute therefor, for the purpose of furnishing an electric current.

In practicing my invention, the scrap tin-plate is immersed in an electrolyzing-bath contained in a suitable vat, and is connected with a galvanic battery, or other means of furnishing a current of electricity, in such manner that the said scrap constitutes the anode for the current, while the vat itself, or some suitable conductor contained in it, constitutes the cathode for the current. Various liquids may be used for the electrolyzing-bath—in fact, any liquid may be used that will dissolve the tin when excited by electricity. I prefer, however, solutions which contain a quantity of free alkali, such as caustic potash or caustic soda.

Any galvanic battery may be used to generate or furnish the electricity, or any of the magneto-electric machines, the requisite in this particular being a quantity current of sufficient amount. A current of intensity may be used; but I do not recommend the use of such a current.

The vat or tank containing the liquid may be of iron, or of any other metal or substance which will not be affected by its contents; but it is preferable that the vat should be of a material which will conduct electricity.

Scrap tin plates, as usually found in the market, are curled or bent, and are tangled together in masses, so that some parts of each scrap are overlapped by adjacent scraps, or frequently by other parts of itself. On the other hand, the currents of electricity pass directly, or thereabout, from the surfaces of the anode in the electrolyzing-bath to those of the cathode. Hence, if the scraps of tin-plate remain in mass while they are subjected in the bath to the action of electricity, the tin will be removed most rapidly from those parts of the scraps which are opposite the surfaces of the cathode, while the overlapped surfaces of the mass will be but slightly, if at all, affected. Therefore, according to my invention, the scraps are first separated and extended to such extent that their surfaces are not overlapped to any material extent, and they are subjected in this separated and extended condition to the electric action.

For the latter purpose, the scraps, according to one part of my invention, are placed upon the cross-bars of an endless chain of rods or other moving frame connected electrically with the positive pole of the source of electricity, and this chain or frame is moved progressively into, through, and out of the vat, so that the scraps may be entered progressively into the bath, and removed progressively therefrom, and that the operation may go on continuously.

According to another part of my invention, the bath in which the scraps are immersed while under the action of electricity is heated, by preference, to the boiling-point of the liquid, or thereabout, either by applying heat to the bottom or walls of the vat by means of a furnace and flues suitably arranged, or by means of a coil of steam-pipe immersed in the vat.

The several improvements which constitute my invention are set forth in detail at the close of this specification; but in order that the same may be fully understood, I will proceed to describe the form of apparatus and the mode of treating the scrap tin-plate which I have used with success in practicing my invention.

Figure 1 of the accompanying drawings represents a plan of the apparatus used by me. Fig. 2 represents a central vertical transverse section of the same. Fig. 3 represents a partial side view of the same with the side of the vat removed.

The vat or tank A of the said apparatus is made, by preference, of boiler-iron. It is open at its top, and is fitted at its bottom with a faucet, F, by means of which its contents can be drawn off. This tank is traversed by the endless chain of rods B, which consists of two parallel endless wire ropes or chains, connected by rods C C. The endless chain of rods is supported by and suspended from a pair of pulley-wheels, D D, that are secured to a shaft, E, which is constructed to turn in suitable bearings H above the tank.

The rims of the pulleys are grooved, or otherwise formed so as to retain the ropes or chains in their places and cause them to move with the pulleys, so that the turning of the pulley-shaft by means of a crank, $g$, or by power applied to a belt-pulley, G, causes the chain of rods to move progressively through the tank, its rods descending successively into the tank at one side thereof, and being successively raised from the tank at the opposite side. The speed of movement of the chain of rods determines the duration of the period of immersion of the articles in the electrolyzing-bath contained in the vat or tank; consequently, if the chain be driven by power, its speed should be regulated by some one of the well-known mechanical governors or regulators of speed, and the power should be transmitted to the shaft through the intervention of a belt and reversed cone-pulleys, or other means that will enable the speed to be varied as found expedient, to lengthen or shorten the period of immersion of the articles, according to the rapidity with which the operation of removing the tin proceeds, the general rule being that the period of immersion should be only long enough to permit the tin to be removed from the iron basis of the scraps. The length of time required for this purpose depends upon the character of the solvent or solution, the amount of scrap or other articles under treatment, the thickness of the coating to be removed, and the density of the current of electricity in use. The complete solution and removal of the tin from scrap-tin may be effected in a few minutes. A conductor, $h$, from the positive pole of the battery should be connected electrically with the shaft E, or with one of the wheels D D, and a conductor, $h'$, from the negative pole of the battery should be fastened at some convenient point on the vessel or tank A. The shaft E, wheels D D, ropes or chains $a\ a$, and rods C C should be insulated from, or not in electrical connection with, the vat or tank A, so that the current of electricity may pass through the solvent or solution. Thus the vat or tank becomes the cathode, and the wire ropes or chains, rods, and pieces of scrap, or other articles to be operated on, the anode, for the current of electricity.

The vat or tank is filled nearly to its brim with the electrolyzing solution constituting the bath. The solutions which I have used with success are the following, viz: Caustic soda, three pounds, and nitrate of soda, one pound, to every gallon of water contained in the vat; or, caustic potash, three pounds, and nitrate of potash, one pound, to every gallon of water; or, caustic soda, one-fifth pound, and chloride of sodium, (common salt,) two pounds, to every gallon of water. The proportions and constituents of the solution may, however, be varied, as circumstances or the views of different users may render expedient.

The rods C may be plain iron or copper rods, or may be fitted with projections, hooks, or other appliances, upon which the scraps may be hung, the only requisite being that when the scraps are on the rods the scraps are in electrical connection with the battery or its substitute. Heat is applied to the contents of the vat, either by building it in brick-work, forming flues like those of a steam-boiler, and communicating with a furnace, or by immersing in the tank a coil of iron steam-pipes, supplied with steam from a steam-boiler.

The chain of rods being put in motion, the tin-plate scraps are separated from the mass of scraps by being picked up one at a time, by children, are pulled lengthwise, so as to extend them partially or wholly, and are hung upon the rods of the chain above the vat at the descending side of the chain, one end of each scrap being bent into a hook form for the purpose. The scraps thus separated and extended are, by the movement of the chain, carried progressively down into the bath, and upward at its opposite side, and when they are raised above the vat they are removed by children.

During the immersion of the scraps in the bath they are treated by the conjoined agencies of the solution forming the bath—electricity and heat. The tin is dissolved from the scraps and separates at the cathode, and it is deposited in the vat in the condition of crystals of metallic tin. The material thus deposited may be withdrawn from the vat through the faucet F without removing the cathode, or may be scooped out, and the tin matter thus recovered from the scrap tin plates is washed, and either reduced to the form of block-tin by the usual metallurgic processes, or is otherwise utilized. The iron of the scraps, being cleansed of the tin, is rendered useful for the purposes for which scrap-iron is used.

The process being a continuous one, though but a comparatively small amount of scrap is under treatment at once, a large quantity can be disposed of in a given time, and much valuable metal, which is now worthless, can be utilized at a comparatively trifling cost.

The solution constituting the bath remains practically permanent, it being necessary only to replace such water as may be dissipated by evaporation, and to add from time to time enough of the other constituents to replace the small quantity unavoidably removed with the iron scraps, and not saved by washing them.

For the purpose of increasing the surface of the cathode, and bringing it into a position to work more satisfactorily in connection with the anode, a division-plate, K, of sheet-iron or other suitable material, is arranged in the vat or tank between the entering and receding portions of the chain of rods, so as to present an antagonistic surface to both the ascending and descending portions of the chain of rods when in motion.

I find it expedient to so proportion the breadth of the vat that the chain of rods is about one foot distant from the surface of the cathode at each side of them.

In place of constructing the vat or tank of iron, it may be constructed of some non-conductor of electricity, and may have sheets or plates of iron, copper, or brass suspended in it at both sides of the chain of rods, and connected electrically with the negative pole of the battery, so as to form the cathode.

In place of having the rods permanently secured to the chains or wire ropes, it is convenient to have them hung upon hooks or other appliances attached to the chains or ropes. In such case the rods may be charged with scraps when separated from the chains or ropes and then applied to them. The rods, also, may be removed from the chains, so as to facilitate the stripping of the scraps from the rods.

The chains or rods may be moved continuously, or at short intervals, as found most convenient; and if some parts of my invention are used without others, the scraps may be applied in a separated condition to a rack or frame of rods, which is lowered into the vat, left there long enough to permit the tin to be separated, and then withdrawn from the vat.

I do not limit my invention to the employment of a certain kind of solvent or solution, but prefer those which, under the conditions employed, have no dissolving or injurious effect upon the iron of the scrap.

I do not limit my invention to the described apparatus, as various devices may be used—continuous and intermittent, horizontal and perpendicular, with wire ropes, chains, or frames operated by hand or acting automatically; but I prefer the apparatus represented in the drawing, and above described.

I am aware that tin has been dissolved by various solvents excited by electricity in galvano-plastic operations, and for the purpose of plating with that metal.

I am also aware that scrap tin plates have been treated by various acid solvents, and also by solutions of caustic alkalies.

I am also aware that it has been proposed to treat scrap tin-plate in mass in a bath by electricity. Therefore, I do not claim, broadly, the treatment of scraps of tin-plate by solvents, nor the treatment of them by solutions of caustic alkalies, nor the treatment of them in every condition by electricity while in an electrolyzing-bath.

I am also aware that in galvano-plastic operations copper and gold solutions are heated; but in this case the metal is plated upon the cathode instead of dropping free thereof in the vat. Therefore, I do not claim the heating of solutions from which metals are to be separated by electricity.

I claim as my invention—

1. The improvement in the art of recovering tin from scrap tin-plate, consisting in the treatment of the same, substantially as before set forth, in a separated and extended condition, in an electrolyzing-bath, by the agency of electricity.

2. The improvement in the art of recovering tin from scrap tin-plate, consisting of the treatment of the same, substantially as before set forth, in a separated condition, and progressively, in an electrolyzing-bath, by the agency of electricity.

3. The improvement in the art of recovering tin from scrap tin-plate, consisting of the treatment of the same, substantially as before set forth, in a separated condition, by the joint agencies of electricity and heat.

4. The combination, substantially as before set forth, of the vat, the endless chain of rods, and the electric battery.

5. The combination, substantially as before set forth, of the vat, the endless chain of rods, the supplementary cathode, arranged within said chain of rods, and the electric battery.

6. The combination, substantially as before set forth, of the vat, the means of heating the contents thereof, the endless chain of rods, and the electric battery.

Witness my hand this 31st day of December, A. D. 1875.

NATHANIEL SHEPARD KEITH.

Witnesses:
SAML. TRO. SMITH,
A. T. JOHNSTON.